United States Patent
Yang

(10) Patent No.: US 7,340,222 B2
(45) Date of Patent: Mar. 4, 2008

(54) METHOD FOR IMPLEMENTING A RF MODULE ON A MOTHERBOARD

(75) Inventor: Ching-Hwa Yang, Taipei Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 404 days.

(21) Appl. No.: 11/198,150

(22) Filed: Aug. 8, 2005

(65) Prior Publication Data

US 2006/0217149 A1    Sep. 28, 2006

(30) Foreign Application Priority Data

Mar. 22, 2005    (TW) ............... 94108844 A

(51) Int. Cl.
*H04B 1/26* (2006.01)
(52) U.S. Cl. ..................... 455/90.3; 455/349
(58) Field of Classification Search ............... None
See application file for complete search history.

(56) References Cited

U.S. PATENT DOCUMENTS

2002/0049042 A1* 4/2002 Oida et al. ............... 455/90
2006/0291177 A1* 12/2006 Choi et al. ................ 361/780

FOREIGN PATENT DOCUMENTS

CN    1294484      5/2001
CN    2631137 Y    8/2004

* cited by examiner

*Primary Examiner*—Thanh Cong Le
(74) *Attorney, Agent, or Firm*—Rabin & Berdo, P.C.

(57) ABSTRACT

A method for implementing a wireless radio frequency (RF) module on a motherboard is described. First, the whole wireless RF module is formed on a daughter board, and at least one through hole is formed at or near the edge of the daughter board. Finally, the daughter board is mounted in the motherboard by a method such as surface mount design (SMD), and the through hole is filled with a conductive material to connect circuits on the daughter board and the motherboard to each other.

18 Claims, 1 Drawing Sheet

METHOD FOR IMPLEMENTING A RF
MODULE ON A MOTHERBOARD

RELATED APPLICATIONS

The present application is based on, and claims priority from, Taiwan Application Serial Number 94108844, filed Mar. 22, 2005, the disclosure of which is hereby incorporated by reference herein in its entirety.

BACKGROUND

1. Field of Invention

The present invention relates to a method for combining a radio frequency (RF) module on a motherboard of a computer system. More particularly, the present invention relates to a method for forming an integrated structure of a RF module on a motherboard of a computer system.

2. Description of Related Art

Increasingly developed communication technology brings more kinds of systems which can be used as a communication platform. From the circuit-switch telegram and telephone system in the early days to the packet-switch information network system in the present days, all are communication systems. A computer is the most important data accessing platform in the information network; hence, a module used to access the network data is usually installed in conventional computers.

The method for accessing the network data can be divided into several steps, of which a preliminary step is fetching an analog signal. For example, the physical line of an Ethernet system is used to transmit the encoded electronic signal. Therefore, when a computer system is used to receive data by Ethernet, the analog electronic signal should first be received via an analog signal processing module, called a physical layer, and then be converted into a digital data for follow-up processing by the digital data processing circuit in the computer system. Similarly, when the computer system is used to transmit digital data via an Ethernet, the digital data should first be converted to an analog electronic signal by the analog signal processing module, and then the analog electronic signal can be transmitted in a physical line. An analog signal processing module is thus an essential component for the computer system with a data communication function.

The physical transmission of wireless local area network (WLAN) system, such as the communication standards IEEE 802.11 a/b/g/n, also transmits an analog signal, but an analog electric wave signal transmitted by air is substituted for the analog electronic signal transmitted by a physical line. The computer system still needs a wireless radio frequency (RF) module to process the analog electric wave signal.

The integrated design of system circuit is a trend in the circuit design nowadays, and components such as a video card, an audio card and a wired network card are often integrated into a motherboard of a computer system. But some problems result if the wireless RF module is integrated into the motherboard of a computer system; for example, the operation efficiency of the wireless RF module will be substantially degraded because the digital signal processed by other digital units on the motherboard easily interfere with the analog signal processed by the wireless RF module.

The wireless network unit comprising a wireless RF module and a digital signal processing module is completely formed on an interface card in the conventional method. The wireless network interface card is then connected to a motherboard of computer via a standard interface, such as mini peripheral component interconnect (PCI). There is an isolating mechanism needed between the wireless RF module and the digital signal processing module for preventing the interference from each other digital units. The above-mentioned method for forming the wireless network unit has some drawbacks, such as a higher cost and a larger volume. Because an additional isolating mechanism and a standard interface are needed when both the wireless RF module and the digital signal processing module are formed on the interface card, forming the wireless network unit is more expensive. Moreover, because the standard interface is needed, the volume of the wireless network unit is difficult to reduce, and this are disadvantageous for installing the wireless network unit in a miniature computer system.

SUMMARY

It is therefore an objective of the present invention to provide a method for integrating a wireless RF module and a motherboard in a computer system.

It is another objective of the present invention to provide a method for preventing other digital circuits in a computer system from interfering with the wireless RF module.

It is still another objective of the present invention to provide a method for reducing the cost of a wireless RF module in a computer system.

It is another objective of the present invention to provide a method for flexibly replacing the wireless RF module in a computer system.

According to the foregoing objectives of the invention, a wireless RF module is first entirely formed on a daughter board. At least one through hole is formed at the edge of the daughter board, and the wire used by the wireless RF module to connect with a motherboard extends to the through hole. Then, the daughter board is mounted on the motherboard, and a contact used by the motherboard to connect with the wireless RF module is located under the through hole at this time. Finally, the through hole is filled with a conductive material to connect the wire of the wireless RF module and the contact of the motherboard.

BRIEF DESCRIPTION OF THE DRAWINGS

These and other features, aspects, and advantages of the present invention will become better understood with regard to the following description, appended claims, and accompanying drawings, where:

DESCRIPTION OF THE PREFERRED EMBODIMENTS

Figure 1:
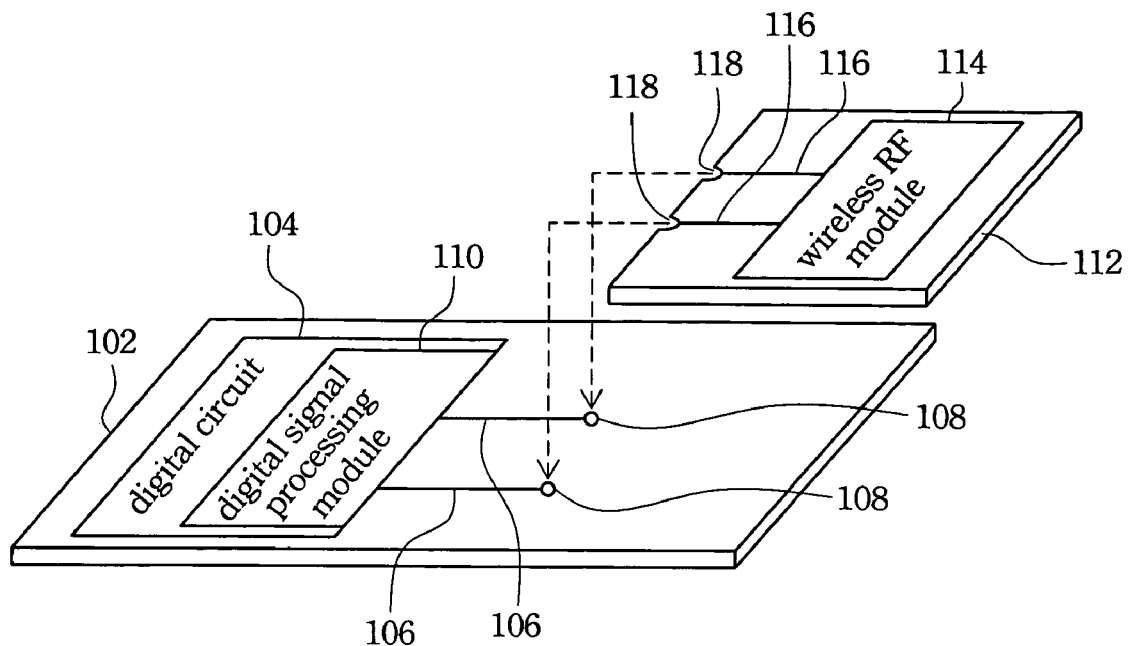
FIG. 1 is a diagram of a motherboard according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

A wireless network unit in a computer system can be approximately separated into two parts. One part is the wireless radio frequency (RF) module used to process the analog signal, and the other part is the digital signal processing module used to process the digital signal. One of the goals of the present invention is that both modules can be integrated into a motherboard of the computer system. This goal does not degrade the performance of the digital signal processing module, but results in some problems for the wireless RF module. For example, the operation efficiency of the wireless RF module will be degraded by digital signal interference. Therefore, the feature of the present invention is to form the wireless RF module on an independent region, first, and then connect the independent region to the motherboard. The digital circuits on the motherboard accordingly do not interfere with the wireless RF module.

FIG. 1 shows a diagram of the motherboard and the wireless RF module made by the method according to an embodiment of the present invention. The motherboard 102 may be a system motherboard in the conventional computer system, and it may be a printed circuit board (PCB). In general, many kinds of digital circuit unit are designed and formed on the motherboard 102, such as a central processing unit (CPU) and a memory unit. All of the digital circuit units on the motherboard 102 are herein referred to as digital circuit 104. It should be particularly noticed that a digital signal processing module 110 of the wireless network unit to be formed is also included in the digital circuit 104 in practice, because the digital signal processing module 110 can be directly integrated with the other digital circuit units on the motherboard 102. Wires 106 extend from the digital signal processing module 110 in the digital circuit 104 for connecting to the following wireless RF module, and contacts 108 are formed at an end of the wires 106 for contact with other wires.

Since the wireless RF module 114 of the above-mentioned wireless network unit is unsuitable for formation directly on the motherboard 102 as the digital signal processing module 110, the wireless RF module 114 can be designed and formed on a daughter board 112 at first. The daughter board 112 may be a PCB, just like the motherboard 102, but may be smaller. The wireless RF module 114 comprises all the essential components used to process the electronic signal of wireless network system, such as a wireless transceiver, a low noise amplifier (LNA), a power amplifier (PA) and an antenna connector used to connect with an electric wave antenna. In accordance with the general wireless network standards, the wireless RF module 114 may be able to process the analog electronic signal with the frequency of 2.4 GHz or 5 GHz.

Similarly, wires 116 on the daughter board 112 extend from the wireless RF module 114 to through holes 118 located at the edge of the daughter board 112. The wires 116 are used as the medium for connecting with the digital signal processing module 110. The through holes 118 shown in FIG. 1 are the indentations formed at the edge of the daughter board 112. Through holes 118 can be treated as an open-type semicircular hole, or as a closed-type circular hole near the edge of the daughter board. In addition, a conductive material, such as copper, may be coated on the side wall of the through holes 118 for enhancing electric conductivity and metal adhesion.

The daughter board 112 should be fastened on the motherboard 102 for combining the wireless RF module 114 and the motherboard 102. In this embodiment, the daughter board 112 is fastened on a surface of the motherboard 102 by the conventional surface mount design (SMD), and the location of the daughter board 112 on the motherboard 102 is not limited. When the daughter board 112 is located on the motherboard 102, the through holes of the daughter board 112 are located on the contacts 108 to connect together wires 106 and 116.

After the daughter board 112 and the motherboard 102 are combined, the through holes 118 are filled with the conductive material, such as tin, for connecting the wires 106 on the motherboard 102 and the wires 116 on the daughter board 112. Thus, the digital signal processing module 110 on the motherboard 102 and the daughter board 112 are connected to each other and become a wireless network unit on the motherboard 102, and the digital circuit 104 on the motherboard 102 does not interfere with the operation of the wireless RF module 114. Furthermore, the wireless RF module 114 can be easily replaced with the daughter board 112 when the operation frequency of the wireless network unit needs to be changed.

Figure 2:
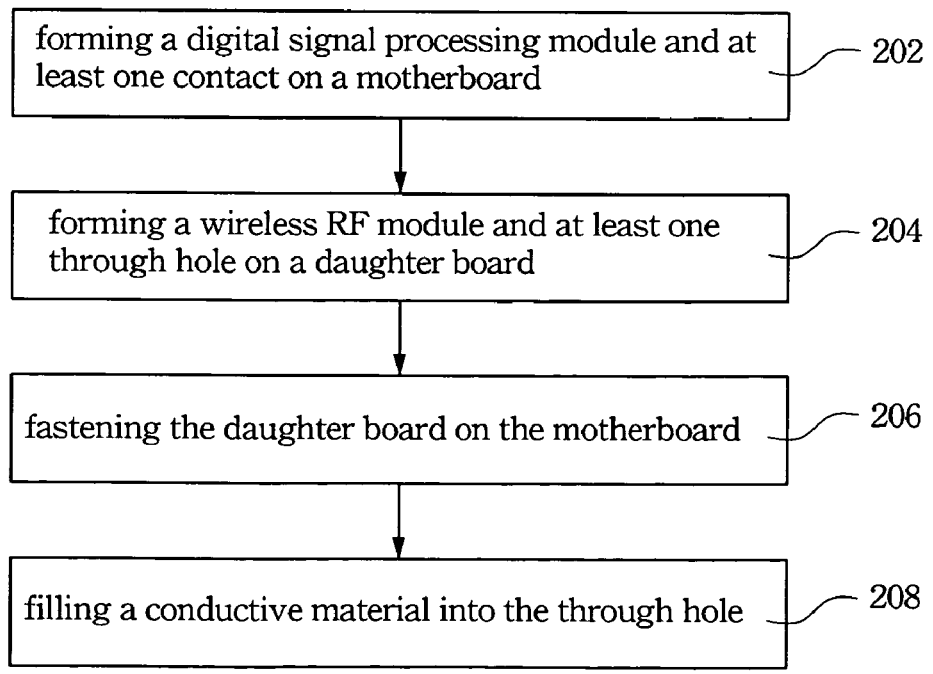
FIG. 2 is a flow chart of a method according to an embodiment of the present invention for implementing a RF module on a motherboard.

A flow chart of the method according to the embodiment of the present invention is shown in FIG. 2. In step 202, the digital signal processing module of a wireless network unit and the digital units of a computer system are designed and formed on a motherboard, and the wire of the digital signal processing module is extended to at least one contact. In step 204, the wireless RF module of the wireless network unit is designed and formed on a daughter board, and the wire of the wireless RF module is extended to at least one through hole located at or near the edge of the daughter board. In step 206, the daughter board and the motherboard are combined by a fastening technique, such as SMD. The through hole in the daughter board should be located on the contact of the motherboard. In step 208, the through hole is filled with a conductive material to contact both the contact on the motherboard and the wire of the wireless RF module on the daughter board for connecting the wireless RF module and the digital signal processing module.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for forming a wireless network unit on a motherboard for a computer, the method comprising:
   providing a daughter board;
   forming a digital signal processing module and at least one contact on said motherboard, wherein a wire of said digital signal processing module is extended to said contact;
   forming a wireless radio frequency (RF) module and at least one through hole on said daughter board, wherein a wire of said wireless RF module is extended to said through hole;
   fastening said daughter board on a surface of said motherboard, wherein said through hole is located on said contact; and
   filling said through hole with a conductive material, wherein said conductive material contacts said through hole and said contact, electronically connecting to each other the wire of said wireless RF module and the wire of said digital signal processing module.

2. The method of claim 1, wherein said wireless RF module comprises a wireless transceiver, a low noise amplifier (LNA), a power amplifier (PA) and an antenna connector.

3. The method of claim 1, wherein said wireless RF module processes an analog electronic signal with a frequency of about 2.4 GHz or 5 GHz.

4. The method of claim 1, wherein said motherboard is a printed circuit board (PCB).

5. The method of claim 1, wherein said daughter board is a printed circuit board (PCB).

6. The method of claim 1, wherein said through hole is an open-type semicircular hole at an edge of said daughter board or a closed-type circular hole near an edge of said daughter board.

7. The method of claim 1, wherein sidewalls of said through hole are coated with copper.

8. The method of claim 1, wherein said daughter board and said motherboard are combined by surface mount design (SMD) in said fastening step.

9. The method of claim 1, wherein said conductive material is tin.

10. A computer system with a wireless network unit, comprising:
    a motherboard;
    a digital signal processing module formed on said motherboard;
    at least one contact formed on said motherboard, wherein a wire of said digital signal processing module is extended to said contact;
    a daughter board fastened on a surface of said motherboard;
    a wireless radio frequency (RF) module formed on said daughter board;
    at least one through hole formed in said daughter board and located on said contact, wherein a wire of said wireless RF module is extended to said through hole; and
    a conductive material filling said through hole, wherein said conductive material contacts both the wire of said wireless RF module and said contact for said wireless RF module, and said digital signal processing modules are connected to each other.

11. The computer system of claim 10, wherein said wireless RF module comprises a wireless transceiver, a low noise amplifier (LNA), a power amplifier (PA) and an antenna connector.

12. The computer system of claim 10, wherein said wireless RF module processes analog electronic signals with a frequency of about 2.4 GHz or 5 GHz.

13. The computer system of claim 10, wherein said motherboard is a printed circuit board (PCB).

14. The computer system of claim 10, wherein said daughter board is a printed circuit board (PCB).

15. The computer system of claim 10, wherein said through hole is an open-type semicircular hole at an edge of said daughter board or a closed-type circular hole near the edge of said daughter board.

16. The computer system of claim 10, wherein side walls of said through hole are coated with copper.

17. The computer system of claim 10, wherein said daughter board is fastened on said motherboard by surface mount design (SMD).

18. The computer system of claim 10, wherein said conductive material is tin.

* * * * *